(12) United States Patent     (10) Patent No.:   US 12,565,063 B2

Izumo                   (45) Date of Patent:       Mar. 3, 2026

---

(54) TIRE

(71) Applicant: SUMITOMO RUBBER INDUSTRIES, LTD., Kobe (JP)

(72) Inventor: Suguru Izumo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 368 days.

(21) Appl. No.: 17/841,351

(22) Filed: Jun. 15, 2022

(65) Prior Publication Data

US 2023/0023252 A1      Jan. 26, 2023

(30) Foreign Application Priority Data

Jul. 14, 2021    (JP) ................................. 2021-116670
Apr. 13, 2022    (JP) ................................. 2022-066347

(51) Int. Cl.
     B60C 1/00          (2006.01)
     B60C 11/13        (2006.01)
            (Continued)

(52) U.S. Cl.
     CPC ............ B60C 11/13 (2013.01); B60C 1/0016 (2013.01); C08L 7/00 (2013.01);
            (Continued)

(58) Field of Classification Search
     CPC ..... B60C 2011/0339; B60C 2011/0341; B60C 2011/0344; B60C 2011/0346;
            (Continued)

(56) References Cited

U.S. PATENT DOCUMENTS 5,430,088 A     7/1995   Ohashi et al.
5,500,482 A *   3/1996   Muraki ..................... C08L 7/00
                                        525/98

(Continued)

FOREIGN PATENT DOCUMENTS

JP         6-279624 A     10/1994
JP     2017-94891 A     6/2017

(Continued)

OTHER PUBLICATIONS

Extended European Search Report for corresponding European Application No. 22179806.9, dated Nov. 16, 2022.

(Continued)

*Primary Examiner* — Justin R Fischer

(74) *Attorney, Agent, or Firm* — Birch, Stewart, Kolasch & Birch, LLP

(57)                ABSTRACT

It is an object to provide a tire having well-improved fuel efficiency, wet grip performance, abrasion resistance, and wet grip performance at a later stage of abrasion. Provided is a tire comprising a tread part of a rubber composition comprising a rubber component comprising an isoprene-based rubber and a styrene-butadiene rubber, wherein a vinyl content of the styrene-butadiene rubber is greater than 26 mol %, wherein a given ratio A of an ash content of the rubber composition is greater than 25%, wherein the tread part comprises two or more circumferential main grooves extending in a tire circumferential direction, and land parts partitioned by the circumferential main grooves, wherein at least one land part of the land parts comprises at least one given flask-like circumferential groove extending in the tire circumferential direction.

14 Claims, 3 Drawing Sheets

(51) Int. Cl.
  C08L 7/00 (2006.01)
  B60C 11/03 (2006.01)
(52) U.S. Cl.
  CPC ................. *B60C 2011/0348* (2013.01); *B60C 2011/0353* (2013.01); *B60C 2200/06* (2013.01)
(58) Field of Classification Search
  CPC ..... B60C 2011/0348; B60C 2011/0351; B60C 2011/0353; B60C 2011/0355; B60C 11/13; B60C 11/1304; B60C 11/1315; B60C 1/0016
  See application file for complete search history.

(56) References Cited

U.S. PATENT DOCUMENTS

2001/0034389 A1* 10/2001 Vasseur ................... C08K 5/31
                                                                    524/137

2011/0048603 A1* 3/2011 Kleffmann .............. B60C 11/04
                                                                    152/209.27
2018/0162176 A1 6/2018 Haseda
2018/0345733 A1 12/2018 Ooba
2021/0070967 A1 3/2021 Nakamura
2021/0268836 A1 9/2021 Miyazaki
2022/0251347 A1 8/2022 Komori et al.

FOREIGN PATENT DOCUMENTS

JP          2019-131700 A      8/2019
WO     WO 2020/003655 A1     1/2020
WO     WO 2020/261874 A1     12/2020

OTHER PUBLICATIONS

Office Action issued in Japanese Patent Application No. 2022-066347, dated Jan. 20, 2026.

* cited by examiner

FIG. 2

TIRE

TECHNICAL FIELD

The present disclosure relates to a tire having well-improved fuel efficiency, wet grip performance, abrasion resistance, and wet grip performance at a later stage of abrasion.

BACKGROUND OF THE INVENTION

It is known to use a carbon black micronized or having a high structure for improving abrasion resistance of a tires for truck/bus (for example, JP H06-279624 A).

By the above methods of using a carbon black micronized or having a high structure, however, improvement in fuel efficiency of the tire is not sufficient. Moreover, deterioration of processability accompanied by the micronization may also results in deterioration of dispersibility of carbon black, and conversely, may result in deterioration of the tire. Accordingly, there has been a limit to improvement of performances by the conventional methods of improvement of carbon black.

Moreover, there has been increasing demands for not only abrasion resistance but also fuel efficiency, wet grip performance, etc. also on the tire for truck/bus due to influence of environmental regulations in recent years.

It is an object of the present disclosure to provide a tire having well-improved fuel efficiency, wet grip performance, abrasion resistance, and wet grip performance at a later stage of abrasion.

SUMMARY OF THE INVENTION

As a result of intensive studies, the present inventor has found that, in a tire comprising a tread part formed of a rubber composition comprising a rubber component comprising an isoprene-based rubber and a styrene-butadiene rubber that has a predetermined a vinyl content, by setting a ratio of an ash content to a predetermined amount or more and forming a predetermined flask-like circumferential groove on any land part of the tread part, the above-described problem can be solved, and conducted further studies to complete the present disclosure.

That is, the present disclosure relates to:

a tire comprising a tread part of a rubber composition comprising a rubber component comprising an isoprene-based rubber and a styrene-butadiene rubber, wherein a vinyl content of the styrene-butadiene rubber is greater than 26 mol %, wherein a ratio A of an ash content of the rubber composition that is defined by the following formula is greater than 25%, wherein the tread part comprises two or more circumferential main grooves extending in a tire circumferential direction, and land parts partitioned by the circumferential main grooves, wherein at least one land part of the land parts comprises at least one flask-like circumferential groove extending in the tire circumferential direction, and wherein the flask-like circumferential groove comprises a neck part having a narrow groove width, and a trunk part arranged on an inner side in a tire radial direction with respect to the neck part and having a part with a groove width greater than a maximum groove width of the neck part, $$A = (m_2/m_1) \times 100$$

(wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize organic substances, and $m_2$ denotes a mass of a residue after oxidation and combustion by heating, in air in accordance with JIS K 6226-1:2003, the residue after the pyrolysis and the vaporization (mass: $m_1$)).

The present disclosure provides a tire having well-improved fuel efficiency, wet grip performance, abrasion resistance, and wet grip performance at a later stage of abrasion.

BRIEF DESCRIPTION OF THE DRAWINGS

FIG. 2 is a developed view of a tread part of a tire of FIG. 1.

DETAILED DESCRIPTION

Figure 1:
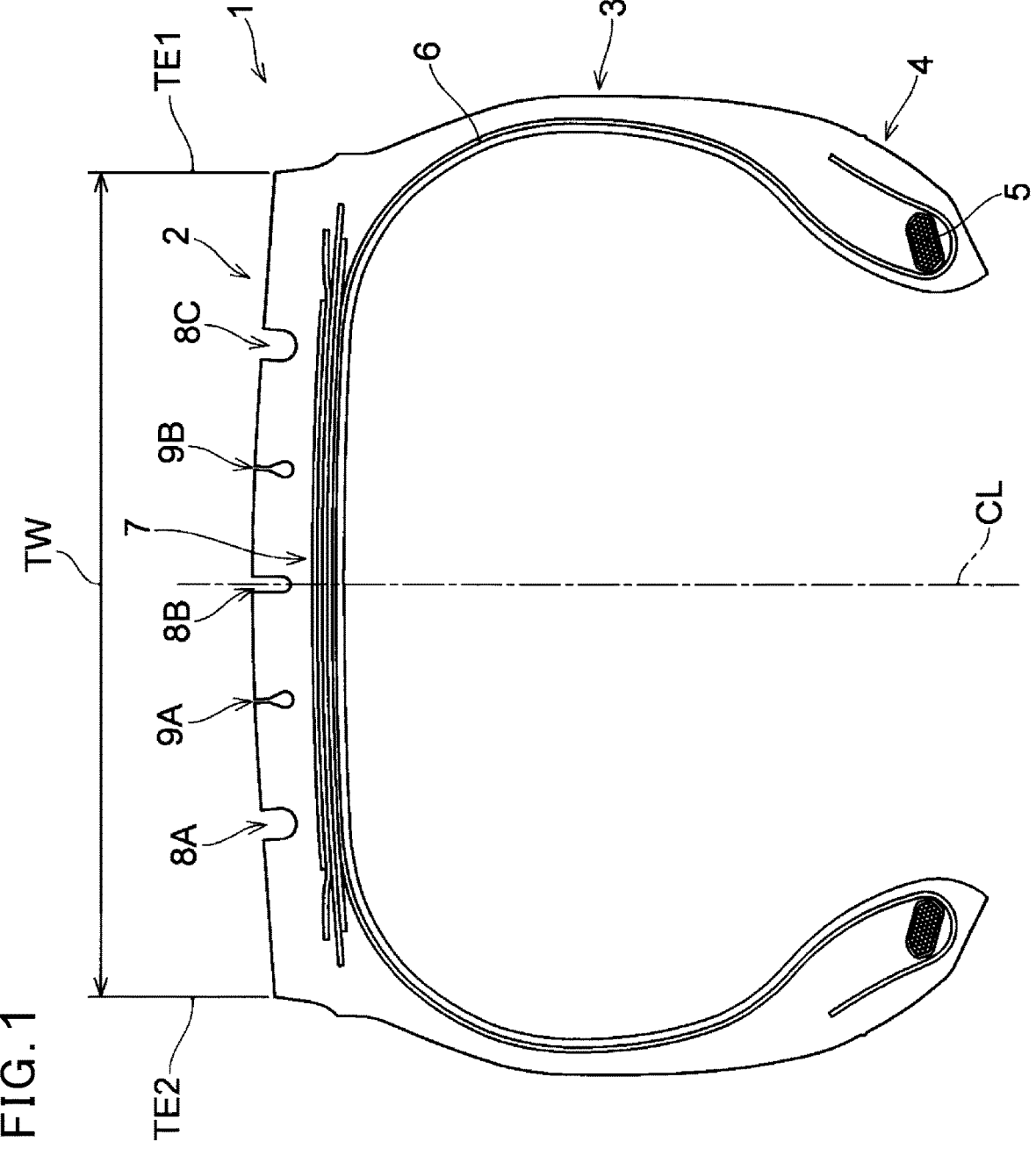
FIG. 1 is a meridional cross-sectional view of a tire according to an embodiment of the present disclosure.

The present disclosure is:

a tire comprising a tread part of a rubber composition comprising a rubber component comprising an isoprene-based rubber and a styrene-butadiene rubber, wherein a vinyl content of the styrene-butadiene rubber is greater than 26 mol %, wherein a ratio A of an ash content of the rubber composition that is defined by the following formula is greater than 25%, wherein the tread part comprises two or more circumferential main grooves extending in a tire circumferential direction, and land parts partitioned by the circumferential main grooves, wherein at least one land part of the land parts comprises at least one flask-like circumferential groove extending in the tire circumferential direction, and wherein the flask-like circumferential groove comprises a neck part having a narrow groove width, and a trunk part arranged on an inner side in a tire radial direction with respect to the neck part and having a part with a groove width greater than a maximum groove width of the neck part, $$A = (m_2/m_1) \times 100$$

(wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize an organic substance, and $m_2$ denotes a mass of a residue after oxidation and combustion by heating, in air in accordance with JIS K 6226-1:2003, the residue after the pyrolysis and the vaporization (mass: $m_1$)).

In the present disclosure, the following is considered as a mechanism by which fuel efficiency, wet grip performance, abrasion resistance, and wet grip performance at a later stage of abrasion of a tire are well improved, although it is not intended to be bound by any theory.

That is, a rubber composition forming a tread part of a tire of the present disclosure comprises a rubber component comprising an isoprene-based rubber and a styrene-butadiene rubber that has a predetermined vinyl content, and a ratio of an ash content is equal to or greater than a predetermined amount. Here, the ratio of the ash content generally indicates a quantity of a ratio of silica in a filler. Such a rubber composition can be expected to (a) contribute to wet grip performance since a glass transition temperature (Tg) of the rubber component becomes relatively high with the rubber component comprising the isoprene-based rubber and the styrene-butadiene rubber, (b) contribute to fuel efficiency since each of the isoprene-based rubber and the styrene-butadiene rubber have a good interactivity with silica and thus dispersion of silica in a kneading process and immobilization of silica to a polymer are improved, and hysteresis (tan $\delta$) of a temperature range contributing to fuel efficiency (a high temperature range such as 70° C.) consequently becomes decreased, and (c) contribute to abrasion resistance since a vinyl content of the styrene-butadiene rubber is a certain amount or more whereby the styrene-butadiene rubber improves in Tg and in ability in co-crosslinking with the isoprene-based rubber. However, in general, an elastic modulus becomes low in a compounding amount with a high ratio of silica, and there is a possibility that the rigidity of the tire tread part may be lowered. Accordingly, a countermeasure such as an act of increasing a LAND/SEA ratio (that is, decreasing the proportion of SAE (groove)) is taken for the purpose of improving pattern rigidity. However, a decrease in the proportion of the groove results in deterioration of wet grip performance. Additionally, its influence becomes more and more remarkable toward the later stage of abrasion. Accordingly, it can be expected that (d) the deterioration of wet grip performance at the later stage of abrasion is compensated by adopting, for any one of the land parts of the tread part, a flask-like circumferential groove (so-called flask group) as a structure playing the similar role as a groove at the later stage of abrasion.

It is considered that, by cooperation of the above-described (a) to (d), the effects of well improving fuel efficiency, wet grip performance, abrasion resistance and wet grip performance at the later stage of abrasion are achieved.

The minimum groove width W1 of the neck part is preferably 1 to 2 mm. The reason is that, with W1 of 1 mm or more, water becomes easy to flow from the neck part to the trunk part during wet running, so that sufficient drainage performance can be easily secured, and, on the other hand, with W1 of 2 mm or less, the neck part becomes easily blocked with grounding pressure when a load is applied to the tread part at an initial stage of abrasion, thereby improving the rigidity of the tread part in tire axial direction.

The maximum groove width W2 of the trunk part is preferably 2 to 12 mm. The reason is that, with W2 of 2 mm or more, a groove width of the flask-like circumferential groove is easily secured also at a terminal stage of abrasion, so that it becomes possible to easily secure sufficient drainage performance, and, on the other hand, with W2 of 12 mm or less, a rubber volume of the tread part is easily secured, thereby contributing to improvement in abrasion resistance.

The maximum groove width W2 of the trunk part is preferably two to six times the minimum groove width W1 of the neck part. The reason is that, with W2 being two times or more as large as W1, a groove width of the flask-like circumferential groove is easily secured also at the terminal stage of abrasion, so that it becomes possible to easily secure sufficient drainage performance, and, on the other hand, with W2 being six times or less as large as W1, a rubber volume of the tread part is easily secured, thereby improving abrasion resistance.

A depth H1 of the flask-like circumferential groove in a tire meridian cross-section and a distance H2 from the groove bottom to the neck part preferably satisfy the following relational expression. The reason is that, with H2/H1 equal to or greater than 1/3, a groove volume of the trunk part is easily secured, so that it becomes possible to easily secure sufficient drainage performance at the terminal stage of abrasion, and, on the other hand, with H2/H1 equal to or less than 2/3, the rigidity of the tread part in the tire axial direction is improved at the initial stage of abrasion.

$$1/3 \leq H2/H1 \leq 2/3$$

The flask-like circumferential groove preferably further comprises an opening part that is arranged on an outer side in a tire radial direction with respect to the neck part and whose groove width expands in a tapered shape and toward the outside in the tire radial direction. The reason is that the opening part having the groove width expanding in a tapered shape causes an increase in a volume of the flask-like circumferential groove at the initial stage of abrasion and an increase in an amount of water flowing from the neck part to the trunk part, thereby improving drainage performance of the tread part.

The rubber composition preferably comprises silica. The reason is that effects of the present disclosure are exerted.

A nitrogen adsorption specific surface area of silica is preferably 175 m²/g or more. The reason is that the effects of the present disclosure are exerted.

The rubber composition preferably comprises carbon black. The reason is that the use of carbon black in combination with silica causes well-balanced reinforcement of an isoprene-based rubber and a styrene-butadiene rubber. Moreover, the reason is that carbon black has a high ability to absorb ultraviolet rays and can suppress deterioration of rubber due to ultraviolet rays.

A styrene content of the styrene-butadiene rubber is preferably 24% by mass or less. The reason is that an increase in Tg with a vinyl content makes it easier to exert the effects of the present disclosure than an increase in the styrene content.

The rubber composition preferably comprises 0.5 to 5.0 parts by mass of zinc oxide. The reason is that it becomes to be more exact that the ratio of the ash content indicates the quantity of a ratio of silica in a filler.

The tire is preferably a heavy-duty tire. The reason is that the effects of the present disclosure can be sufficiently utilized.

In the present disclosure, numerical values of upper limits and lower limits related to "or more", "or less", and "to" for the descriptions of numerical ranges can be arbitrarily combined with each other, and additionally, numerical values in Examples can be also combined with these upper limits and these lower limits. Moreover, in the case that a numerical range is specified using the word "to", unless otherwise noted, such a case means that numerical values at the both ends of the numerical range are included in the numerical range. Additionally, in the present disclosure, a numerical range shown as a range including values at its both ends can be interpreted as simultaneously showing a numerical range not including any one of numerical values at its both ends and a numerical range not including both of numerical values at its both ends as long as such a range is not inconsistent with the spirit of the present disclosure.

[Definition]

A "standardized rim" is a rim defined for each tire in a standard system including a standard, on which the tire is based, by the standard, for example, a "standard rim" in JATMA, "Design Rim" in TRA, or "Measuring Rim" in ETRTO.

A "standardized internal pressure" is an air pressure defined for each tire in a standard system including a standard, on which the tire is based, by the standard, for example, a "MAXIMUM AIR PRESSURE" in JATMA, a maximum value described in the table "TIRE LOAD LIMITS AT VARIOUS COLD INFLATION PRESSURES" in TRA, or "INFLATION PRESSURE" in ETRTO.

A "standardized state" is a state in which the tire is rim-assembled to a standardized rim, filled with an internal pressure, and applied with no load. Besides, in the present disclosure, unless otherwise noted, a dimension and an angle of each part of the tire are measured in the standardized state. In the case that there are a pattern, letters, etc. on a lateral surface of the tire, such measurement is performed on the supposition that there are none of such a pattern, letters, etc.

A "standardized load" is a load defined for each tire in a standard system including a standard, on which the tire is based, by the standard, for example, a "MAXIMUM LOAD ABILITY" in JATMA, a maximum value described in the table "TIRE LOAD LIMITS AT VARIOUS COLD INFLATION PRESSURES" in TRA, or "LOAD CAPACITY" in ETRTO.

A "tread grounding end" is a grounding position (TE1, TE2) at an outermost end in a tire width direction when a standardized load is applied to the tire in the standardized state and the tire comes into contact with a flat surface at a camber angle of 0°.

A "tread grounding width" is a distance between the tread grounding ends TE1 and TE2 in the tire axial direction (TW).

A "circumferential main groove" refers to a groove that extends continuously in a tire circumferential direction and that has a width of 3.0 mm or more on a tread surface.

A "flask-like circumferential groove" refers to a groove extending in the tire circumferential direction and comprising a neck part having a narrow groove width and a trunk part arranged on an inner side in a tire radial direction with respect to the neck part and having a part with a groove width greater than a maximum groove width of the neck part. Here, the wording "the trunk part having a part with a groove width greater than a maximum groove width of the neck part" means that the trunk part is configured to have a part whose width is wider than the maximum groove width of the neck part. Accordingly, the maximum groove width of the neck part is less than the maximum groove width of the trunk part, and the groove width of the neck part is narrow in this sense.

A "land part" refers to an area on the tread surface, the area being partitioned by circumferential main grooves, and a pair of land parts located on the tread grounding end-side is referred to as "shoulder land part" and a land part located on an inner side with respect to the shoulder land parts is referred to as a "center land part".

A "lateral groove" refers to a groove that is engraved on each land part and has a width of 2.0 mm or more, in which an edge component in the tire width direction is larger than an edge component in the tire circumferential direction.

A "sipe" refers to a groove that is engraved on each land part and has a width less than 2.0 mm, in which an edge component in the tire width direction is larger than an edge component in the tire circumferential direction.

[Measurement Method]

(Ratio of Ash Content)

A ratio of an ash content is defined by the following equation.

$$A=(m_2/m_1)\times100$$

(wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize an organic substance, and $m_2$ denotes a mass of a residue after oxidation and combustion by heating, in air in accordance with JIS K 6226-1:2003, the residue after the pyrolysis and the vaporization (mass: $m_1$)).

A "styrene content" is a value calculated by $^1$H-NMR measurement and is applied to a rubber component having repeat units originating from styrene such as, for example, a SBR and the like.

A "vinyl content (1,2-bond butadiene unit amount)" is a value calculated in accordance with JIS K 6239-2:2017 by an infrared absorption spectrum analysis and is applied to a rubber component having repeat units originating from butadiene such as, for example, a SBR, a BR, and the like.

A "cis content (cis-1,4-bond content)" is a value calculated in accordance with JIS K 6239-2:2017 by an infrared absorption spectrum analysis and is applied to a rubber component having repeat units originating from butadiene such as, for example, a BR and the like.

The "Tg" is a value calculated in accordance with JIS K 7121 by differential scanning calorimetry (DSC) and is applied to, for example, a SBR and the like.

A "weight-average molecular weight (Mw)" can be calculated in terms of a standard polystyrene based on measurement values obtained by a gel permeation chromatography (GPC) (for example, GPC-8000 Series manufactured by Tosoh Corporation, detector: differential refractometer, column: TSKGEL SUPERMULTIPORE HZ-M manufactured by Tosoh Corporation). For example, the Mw is applied to, for example, a SBR, a BR, and the like.

A "$N_2$SA of carbon black" is measured in accordance with JIS K 6217-2:2017.

A "$N_2$SA of silica" is measured in accordance with ASTM D3037-93 by a BET method.

[Tire]

A tire that is one embodiment of the present disclosure is described below with reference to the drawings as appropriate. However, the drawings used for the description of the tire merely illustrate one concrete embodiment, and the present disclosure is not limited by these drawings.

A tire of the present disclosure is a tire in which: a tread part has two or more circumferential main grooves that extend in a tire circumferential direction, and land parts partitioned by the circumferential main grooves; at least one land part of the land parts has at least one flask-like circumferential groove extending in the tire circumferential direction; and the flask-like circumferential groove includes a neck part having a narrow groove width and a trunk part arranged on an inner side in a tire radial direction with respect to the neck part and having a part whose groove width is larger than a maximum groove width of the neck part.

FIG. 1 is a meridional cross-sectional view including a tire rotation axis (not shown) in a standardized state of a tire 1 according to the present embodiment. The tire 1 comprises a tread part 2, a pair of sidewall parts 3, a pair of bead parts 4, a pair of bead cores 5, a carcass layer 6, and a belt layer 7. Three circumferential main grooves 8A, 8B, and 8C and two flask-like circumferential grooves 9A and 9B are formed on the tread part 2. A distance between tread grounding ends TE1 and TE2 is a tread grounding width TW.

Figure 2:
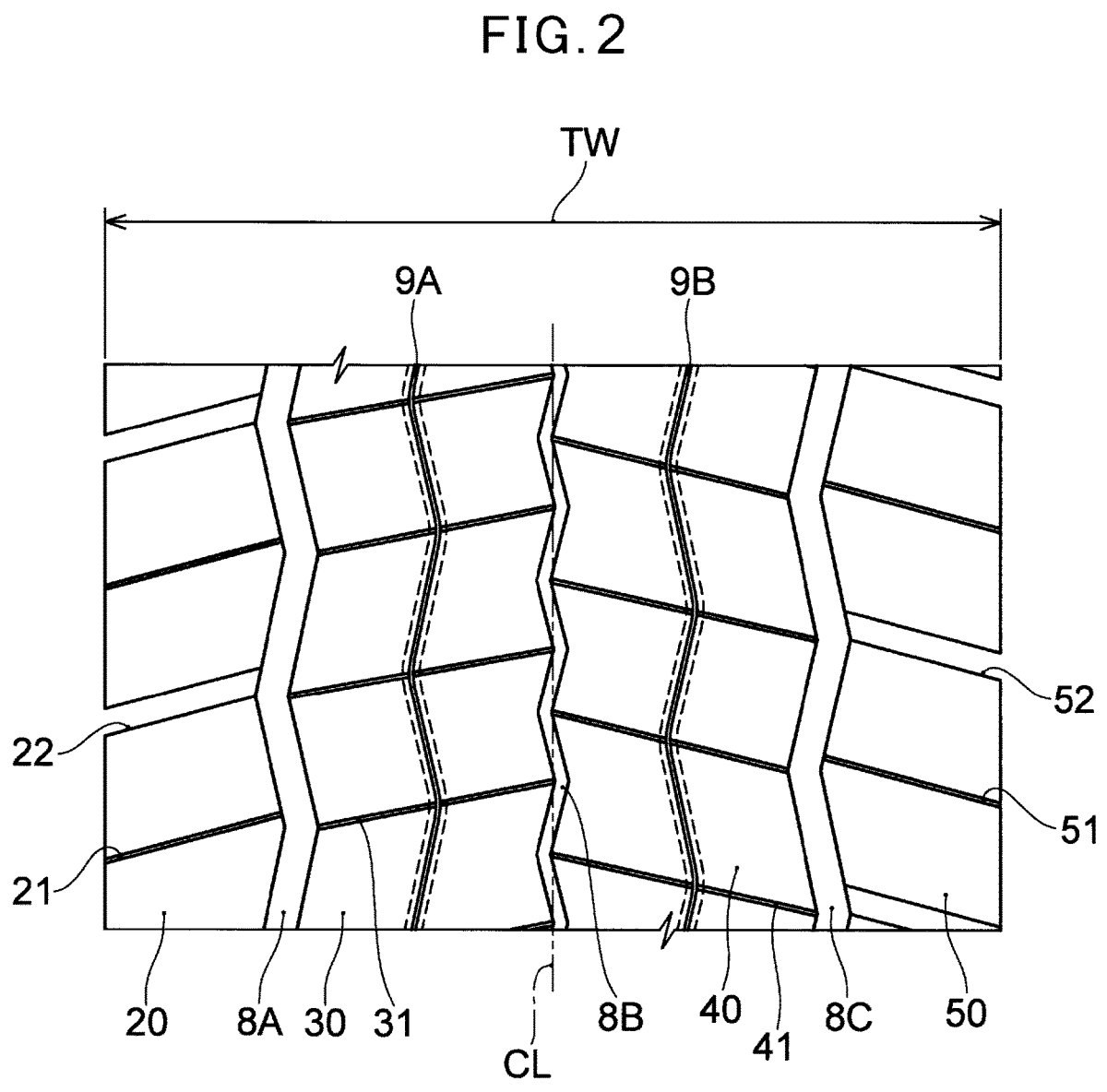

FIG. 2 illustrates the tread part 2 of the tire 1 of the present embodiment. The circumferential main grooves 8A, 8B, and 8C extending in a tire circumferential direction and the flask-like circumferential grooves 9A and 9B extending in the tire circumferential direction are formed on the tread part 2, and lateral grooves and sipes that extend in a tire width direction are formed on land parts partitioned by the circumferential main grooves. That is, among the land parts, on a pair of shoulder land parts 20 and 50 partitioned by the circumferential main groove located at the outermost end-side in the tire width direction (outermost circumferential main groove) 8A or 8C, shoulder sipes 21 and shoulder lateral grooves 22, and shoulder sipes 51 and shoulder lateral grooves 52 are formed, respectively. On a center land part 30 partitioned by the circumferential main grooves 8A and 8B, a center sipe 31 is formed, and on a center land part 40 partitioned by the circumferential main grooves 8B and 8C, a center sipe 41 is formed. Additionally, on the center land part 30, a flask-like circumferential groove 9A is formed, and on the center land part 40, a flask-like circumferential groove 9B is formed.

Although the three circumferential main grooves 8A, 8B, and 8C are formed in FIG. 2, it is sufficient that the number of the circumferential main grooves in the present disclosure is two or more, and it may be four or five or may be six or more. Moreover, all of the circumferential man grooves 8A, 8B, and 8C extend in a zigzag shape while a centerline in a width direction of each circumferential main groove is oscillating from side to side. Here, the phrase "extends in a zigzag shape" is intended to mean that the center in the width direction of the circumferential main groove extends in the tire circumferential direction while the center is oscillating in the tire width direction. Accordingly, the scope of the present disclosure includes not only a configuration in which a straight groove zigzags but also a configuration in which a curved groove curves repeatedly in a wavy shape. However, besides the zigzag shape, the circumferential main grooves may have a straight shape.

Although the flask-like circumferential grooves 9A and 9B are formed on the center land parts 30 and 40, respectively, in FIG. 2, it is sufficient that at least one flask-like circumferential groove is formed on at least one land part. Accordingly, it is sufficient in the present disclosure that one flask-like circumferential groove is formed on any one of the land parts, and two or more flask-like circumferential grooves may be formed on one land part. Moreover, it is sufficient that there is at least one land part on which one or more flask-like circumferential grooves are formed in such a way, and the number of such land parts may be two or may be three or more. Regarding the land parts on which the flask-like circumferential grooves are formed, although such land parts are not particularly limited, a flask-like circumferential groove is preferably formed on a center land part located between the two outermost circumferential main grooves, particularly, the flask-like circumferential groove is preferably formed in the vicinity of the middle point between a centerline of the tire and the outermost circumferential main groove. Since a vicinity of the centerline of the tire is a part at which grounding pressure is highest, it is preferable to keep high rigidity without appearance of any groove also at a later stage of abrasion. However, from the viewpoint of ensuring drainage performance at the later stage of abrasion, it is preferable that a groove appears in the vicinity of the middle point between the centerline of the tire and the outermost circumferential main groove on both sides of tread grounding surface separated by the centerline of the tire. Moreover, the flask-like circumferential grooves may have, besides the zigzag shape, a straight shape, as in the case of the circumferential main grooves.

In FIG. 2, the cross-section of the flask-like circumferential groove takes on a shape of flask. With such a cross-sectional shape, stresses acting on lateral walls of the land parts are relieved even if a large load is applied on the tread part 2.

In the present embodiment, in a case of a bland-new tire or at the initial stage of abrasion of the tread part 2, a part of a flask-like circumferential groove appearing on a grounding surface is a neck part. Since the neck part can be blocked by a load applied on the tread part 2, the rigidity of the tread part 2 in the tire radial direction is increased. On the other hand, as abrasion of the tread part 2 progresses, the grounding surface moves inside in the tire radial direction, and an opening of the flask-like circumferential groove moves from the neck part to a trunk part. Accordingly, the progression of abrasion results in enlargement of the width of the flask-like circumferential groove, thereby keeping drainage performance of the tread part 2 high at the later stage of abrasion.

The tread part 2 of the present disclosure takes on a 4-rib tread pattern with the three circumferential main grooves when the tire is bland-new one, and on the other hand, it takes on a 6-rib tread pattern at the later stage of abrasion with appearance of the trunk parts of the two flask-like circumferential grooves on the tread surface.

Figure 3:
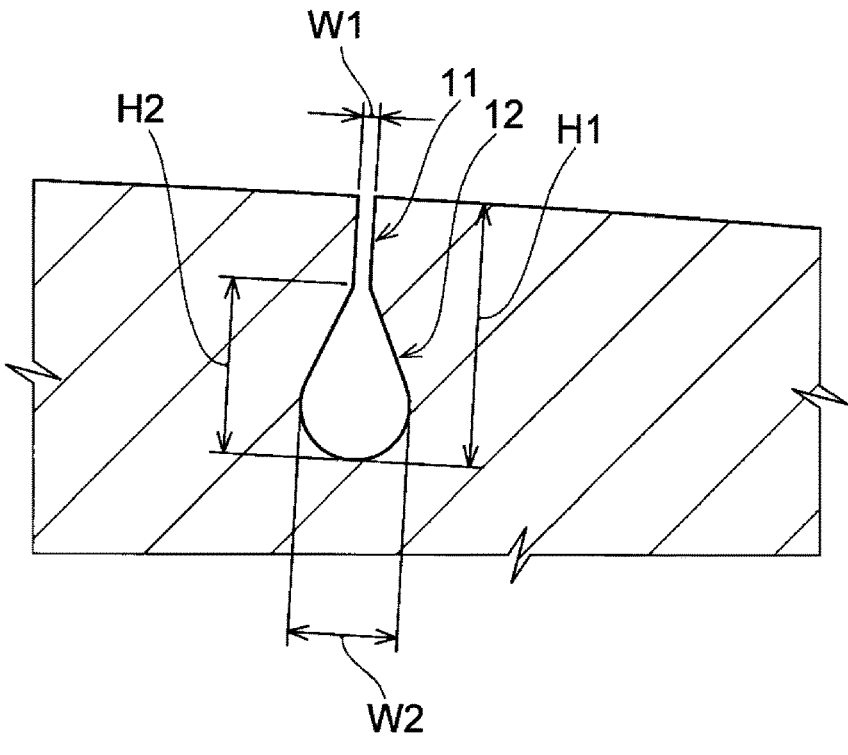
FIG. 3 is an enlarged cross-sectional view illustrating a flask-like circumferential groove of FIGS. 1 and 2.

FIG. 3 illustrates an enlarged flask-like circumferential groove 9 (9A, 9B). The flask-like circumferential groove has a neck part 11 and a trunk part 12 that is arranged on the inner side in the tire radial direction with respect to the neck part and that has a part whose groove width is larger than a maximum groove width of the neck part. Although the groove width of the neck part is fixed with its minimum groove width W1 and is constant in FIG. 3, the neck part may have a part whose groove width is larger than W1 as long as the tire exerts the effects of the present disclosure. Accordingly, the cross-sectional shape of the neck part may have a zigzag shape besides a straight shape as illustrated in FIG. 3. Here, the wording "zigzag shape" has the same meaning as described above. A flask-like circumferential groove having a groove width of its neck part constant with its minimum groove width is cited as one preferred embodiment.

Moreover, the trunk part 12 is one having a part whose groove width is larger than the maximum groove width of the neck part. Here, the wording "having a part whose groove width is larger than the maximum groove width of the neck part" means that the trunk part is configured to have a wider width than the maximum groove width of the neck part so that the trunk part can achieve the effects of the present disclosure. Accordingly, the groove width of the trunk part is not particularly limited as long as the trunk part includes a part larger than the maximum groove width of the neck part so as to enable achievement of the effects of the present disclosure. For example, it is permissible for a part of the groove width of the trunk part to have a narrower part than the maximum groove width of the neck part, or the trunk part may be configured to consist only of a part in which the groove width of the trunk part is larger than the groove width of the neck part. Since the groove width of the neck part 11 is fixed with its minimum groove width W1 in FIG. 3, the trunk part 12 is formed only of a part whose groove width is larger than the groove width of the neck part 11.

The minimum groove width W1 of the neck part is preferably 1 to 2 mm. With W1 of 1 mm or more, water becomes easy to flow from the neck part to the trunk part during wet running, so that it becomes possible to easily secure sufficient drainage performance. On the other hand, with W1 of 2 mm or less, the neck part becomes easily blocked by grounding pressure at the initial stage of abrasion when a load is applied on the tread part 2, so that the rigidity of the tread part 2 in the tire axial direction can be increased. Moreover, a rubber volume of the tread part 2 can be easily secured, thereby improving abrasion resistance of the tire 1. W1 is preferably 1.1 mm or more, more preferably 1.2 mm or more. On the other hand, W1 is preferably 1.9 mm or less, more preferably 1.8 mm or less.

It is desirable that the maximum groove width W2 of the trunk part is 2 to 12 mm. When the maximum groove width W2 is 2 mm or more, a width of the flask-like circumferential groove 9 is easily secured even at a terminal stage of abrasion, so that it becomes possible to easily secure sufficient drainage performance. On the other hand, when the maximum groove width W2 is 12 mm or less, the rubber volume of the tread part 2 is easily secured, thereby improving abrasion resistance of the tire 1. W2 is preferably 3 mm or more, more preferably 4 mm or more. On the other hand, W2 is preferably 11 mm or less, more preferably 10 mm or less.

It is desirable that the above-described W2 is two to six times the above-described W1. With the above-described W2 being two times or more the above-described W1, the width of the flask-like circumferential groove 9 is easily secured even at the terminal stage of abrasion, so that it becomes possible to easily secure sufficient drainage performance. With the above-described W2 that is six times or less the above-described W1, the rubber volume of the tread part 2 is easily secured, thereby improving abrasion resistance of the tire 1. The above-described W2 is preferably 2.5 times or more the above-described W1, more preferably three times or more the above-described W1. On the other hand, the above-described W2 is preferably 5.5 times or less the above-described W1, more preferably 5 times or less the above-described W1.

In the flask-like circumferential groove 9 of the present embodiment, more preferably, it is desirable that the above-described W1 is 1 mm or more, the above-described W2 is 2 mm or more, and the above-described W2 is two times or more the above-described W1. With such a flask-like circumferential groove 9, it becomes possible to easily secure sufficient drainage performance even at the terminal stage of abrasion. Moreover, in the tread part 2, it is desirable that the above-described W1 is 2 mm or less, the above-described W2 is 12 mm or less, and the above-described W2 is six times or less the above-described W1. With such a flask-like circumferential groove 9, the rubber volume of the tread part 2 is easily secured, thereby improving abrasion resistance of the tire 1.

A depth H1 of the flask-like circumferential groove 9 and a minimum length H2 from a groove bottom to the neck part of the flask-like circumferential groove 9 in the tire radial direction preferably satisfy the following relationship.

$$1/3 \leq H2/H1 \leq 2/3$$

With the above-described H2/H1 being 1/3 or more, the groove volume of the trunk part is easily secured, and it becomes possible to easily secure sufficient drainage performance at the terminal stage of abrasion. With the above-described H2/H1 being 2/3 or less, the rigidity of the tread part 2 in the tire axial direction is increased at the initial stage of abrasion. Moreover, the rubber volume of the tread part 2 is easily secured, thereby improving abrasion resistance of the tire 1.

In the flask-like circumferential groove 9 of the present embodiment, more preferably, the above-described W2 is two to six times the above-described W1, and its cross-sectional shape satisfies the relation of $1/3 \leq H2/H1 \leq 2/3$. With the above-described W2 being two times or more the above-described W1 and the above-described H2/H1 being 1/3 or more, it becomes possible to easily secure sufficient drainage performance at the terminal stage of abrasion. With the above-described W2 being six times or less the above-described W1 and the above-described H2/H1 being 2/3 or less, the rubber volume of the tread part 2 is easily secured, thereby improving abrasion resistance of the tire 1.

Figure 4:
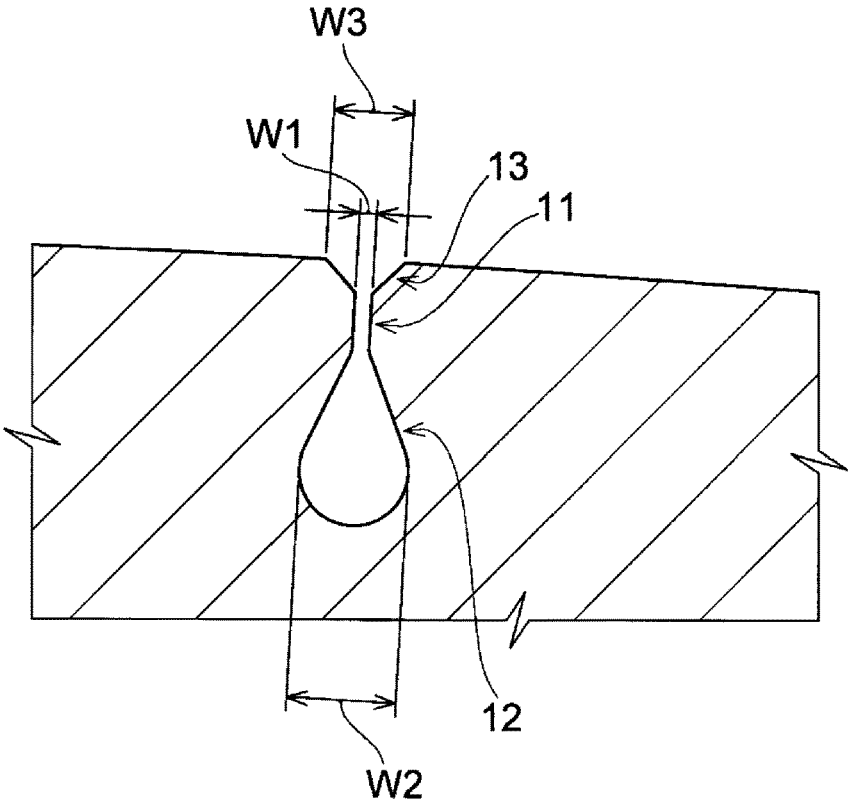
FIG. 4 is an enlarged cross-sectional view illustrating an example of modification of the flask-like circumferential groove.

FIG. 4 illustrates an example of modification of the flask-like circumferential groove. To the parts of the modification example that are not described below, the above-described configurations of the flask-like circumferential groove 9 can also be applied.

In FIG. 4, the flask-like circumferential groove is one comprising an opening part (tapered part) that is arranged on the outside of the neck part in the tire radial direction and whose groove width of the opening part expands in a tapered shape. With the tapered part, a volume of the flask-like circumferential groove is increased at the initial stage of abrasion. Moreover, with the tapered part, an amount of water flowing from the neck part to the trunk part is increased, thereby improving drainage performance of the tread part 2.

The maximum groove width W2 of the trunk part is preferably larger than a maximum groove width W3 of the tapered part. As a result, the groove volume of the flask-like circumferential groove becomes easily secured in the trunk part, and it becomes possible to easily secure sufficient drainage performance of the tread part 2 at the terminal stage of abrasion.

[Rubber composition]

The tire of the present disclosure has a tread part, the tread part being formed of a rubber composition comprising a rubber component comprising an isoprene-based rubber and a styrene-butadiene rubber, wherein the ratio A of the ash content of the rubber composition is greater than 25%.

[Ratio A of ash content]

The ratio A of the ash content is expressed by the following equation.

$$A = (m_2/m_1) \times 100$$

(wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize an organic substance, and $m_2$ denotes a mass of a residue after oxidation and combustion by heating, in air in accordance with JIS K 6226-1:2003, the residue after the pyrolysis and the vaporization (mass: $m_1$)).

$m_1$ denotes a mass of a residue obtained by subjecting a specimen of the rubber composition to so-called acetone extraction to remove a component soluble in acetone in accordance with JIS K 6229 and further heating the specimen after the extraction in nitrogen to mainly pyrolyze and vaporize a polymer component in accordance with JIS K 6226-1:2003. $m_2$ denotes a mass of a residue obtained after oxidizing and combusting mainly carbon black by further heating the residue in air in accordance with JIS K 6226-1: 2003. Accordingly, under the compoundings as in Examples of the present specification, the above-described A generally expresses a ratio (%) of an amount of silica and zinc oxide to a total amount of silica and carbon black and zinc oxide.

The ratio A of the ash content is preferably 26% or more, more preferably 29% or more, further preferably 37% or more, further preferably 60% or more, further preferably 80% or more, further preferably 90% or more, from the viewpoint of the effects of the present disclosure. The ratio A of the ash content may be 100% by mass.

As described above, the ratio A of the ash content generally expresses a ratio (%) of an amount of silica and zinc oxide (mass $m_2$) to a toral amount of silica and carbon black and zinc oxide (mass $m_1$) under the compoundings as in Examples of the present disclosure, and thus, for example, the ratio of the ash content can be increased, for example, by decreasing an amount of carbon black or increasing an amount of silica or zinc oxide, and conversely, it can be decreased by increasing the amount of carbon black or decreasing the amount of silica or zinc oxide.

<Rubber Component>

The rubber component comprises an isoprene-based rubber and a styrene-butadiene rubber (SBR). Accordingly, the rubber component may be a rubber component that further comprises a rubber component other than an isoprene-based rubber and a SBR in addition to the isoprene-based rubber and the SBR or may be a rubber component that consists only of an isoprene-based rubber and a SBR.

(Isoprene-Based Rubber) As an isoprene-based rubber, for example, those common in the tire industry can be used, such as an isoprene rubber (IR) and a natural rubber. Examples of the natural rubber include a non-modified natural rubber (NR), as well as a modified natural rubber such as an epoxidized natural rubber (ENR), a hydrogenated natural rubber (HNR), a deproteinized natural rubber (DPNR), an ultra-pure natural rubber (UPNR), and a grafted natural rubber; and the like.

These isoprene-based rubbers may be used alone, or two or more thereof may be used in combination.

The NR is not particularly limited, and those common in the tire industry can be used, examples of which include, for example, SIR20, RSS#3, TSR20, etc.

In the rubber composition, a content of the isoprene-based rubber in the rubber component is preferably 50% by mass or more, more preferably 55% by mass or more, further preferably 60% by mass or more, further preferably 65% by mass or more. Since silica has a good interactivity with the isoprene-based rubber, the strength of the whole matrix tends to be improved and abrasion resistance and fracture characteristics tend to be further improved, by increasing the content of the isoprene-based rubber in the rubber component and dispersing silica in an isoprene-based rubber phase that becomes a sea phase. On the other hand, from the viewpoint of wet grip performance, the content of the isoprene-based rubber in the rubber component is preferably 95% by mass or less, more preferably 90% by mass or less, further preferably 85% by mass or less, particularly preferably 80% by mass or less.

(SBR)

The SBR is not particularly limited, and any of a solution-polymerized SBR (S-SBR) and an emulsion-polymerized SBR (E-SBR) can be preferably used. Among them, a S-SBR is preferable from the viewpoint of the effects of the present disclosure. Moreover, as the SBR, modified SBRs (a modified S-SBR, a modified E-SBR) thereof can be used. Examples of the modified SBR include a SBR modified at its terminal and/or main chain, a modified SBR coupled with tin, a silicon compound, etc. (a modified SBR of condensate or having a branched structure, etc.), and the like. These SBRs may be used alone, or two or more thereof may be used in combination.

Since the SBR has an excellent viscoelasticity having high correlation with wet grip performance and excellent in interactivity and reactivity with silica, it is considered that the SBR exerts an effect on improvement in wet grip performance and abrasion resistance.

A styrene content of the SBR is preferably 5% by mass or more, more preferably 7% by mass or more, further preferably 9% by mass, from the viewpoints of wet grip performance and abrasion resistance. Moreover, it is preferably 24% by mass or less, more preferably 18% by mass or less, further preferably 16% by mass or less, from the viewpoints of temperature dependency of grip performance and abrasion resistance. Besides, in the present disclosure, the styrene content of the SBR is calculated by $^1$H-NMR measurement.

A vinyl content of the SBR is greater than 26 mol %. When the vinyl content is less than 26 mol %, the tire cannot sufficiently exert wet grip performance or abrasion resistance. The vinyl content is preferably 27 mol % or more, more preferably 28 mol % or more, further preferably 29 mol % or more, further preferably 30 mol % or more. Moreover, the vinyl content of the SBR is preferably 45 mol % or less, more preferably 44 mol % or less, further preferably 43 mol % or less, further preferably 42 mol % or less, from the viewpoints of wet grip performance and abrasion resistance. Besides, in the present disclosure, the vinyl content of the SBR (1,2-bond butadiene unit amount) is measured by infrared absorption spectrometry.

A glass transition temperature (Tg) of the SBR is preferably −80° C. or more, more preferably −70° C. or more, further preferably −65° C. or more, from the viewpoint of wet grip performance. Moreover, the Tg of the SBR is preferably −40° C. or less, more preferably −45° C. or less, further preferably −50° C. or less, further preferably −55° C. or less, from the viewpoint of fuel efficiency. Besides, in the present disclosure, the Tg of the SBR is calculated by removing extending oil using acetone in accordance with JIS K 6229 and subjecting a pure SBR content to differential scanning calorimetry (DSC) in accordance with JIS K 7121.

A weight-average molecular weight (Mw) of the SBR is preferably 100,000 or more, more preferably 150,000 or more, further preferably 190,000 or more, from the viewpoint of abrasion resistance. Moreover, the Mw is preferably 2,500,000 or less, more preferably 2,000,000 or less, further preferably 1,000,000 or less, from the viewpoints of crosslinking uniformity, etc. Besides, the Mw can be calculated in terms of a standard polystyrene based on measurement values obtained by a gel permeation chromatography (GPC) (for example, GPC-8000 Series manufactured by Tosoh Corporation, detector: differential refractometer, column: TSKGEL SUPERMULTIPORE HZ-M manufactured by Tosoh Corporation).

A content of the SBR when compounded in the rubber component is preferably 5% by mass or more, more preferably 10% by mass or more, further preferably 15% by mass or more, further preferably 20% by mass or more, from the viewpoints of abrasion resistance and wet grip performance. Moreover, the content of the SBR is preferably 40% by mass or less, more preferably 35% by mass or less, further preferably 30% by mass or less, further preferably 25% by mass or less, from the viewpoint of abrasion resistance.

(Other Rubber Components)

The rubber component according to the present disclosure may comprise rubber components other than the above-described isoprene-based rubber and SBR. A cross-linkable rubber component commonly used in the tire industry can be used as another rubber component, examples of which include, for example, a butadiene rubber, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), and a hydrin rubber, and the like. These other rubber components may be used alone, or two or more thereof may be used in combination.

The BR is not particularly limited, and those common in the tire industry can be used such as, for example, a BR having a cis content of less than 50% (a low cis BR), a BR having a cis content of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). The BRs may be used alone, or two or more thereof may be used in combination. A cis content of the BR is a value calculated by an infrared absorption spectrum analysis.

A content of the BR when compounded in the rubber component is preferably 20% by mass or less, more preferably 10% by mass or less, further preferably 5% by mass or less, or may be 0% by mass, from the viewpoint of the effects of the present disclosure.

<Filler>

The rubber composition for tread according to the present disclosure preferably comprises a filler comprising carbon black and/or silica. Moreover, the filler may be a filler consisting of carbon black and silica. The filler preferably comprises silica and more preferably comprises carbon black and silica, and the filler may be prepared as a filler consisting of carbon black and silica.

(Silica)

When silica is compounded in the rubber composition for tread according to the present disclosure, fuel efficiency, wet grip performance, abrasion resistance, and the like can be improved. Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. The silica may be used alone, or two or more thereof may be used in combination.

A nitrogen adsorption specific surface area ($N_2$SA) of silica is preferably 130 $m^2/g$ or more, more preferably 150 $m^2/g$ or more, further preferably 170 $m^2/g$ or more, further preferably 175 $m^2/g$ or more, further preferably 185 $m^2/g$ or more, further preferably 195 $m^2/g$ or more, from the view-points of abrasion resistance and fracture characteristics. Moreover, the $N_2$SA is preferably 500 $m^2/g$ or less, more preferably 350 $m^2/g$ or less, further preferably 300 $m^2/g$ or less, further preferably 250 $m^2/g$ or less, from the viewpoint of processability. Besides, the $N_2$SA of silica in the present disclosure is a value measured by a BET method according to ASTM D3037-93.

A content of silica based on 100 parts by mass of the rubber component is preferably 8 parts by mass or more, more preferably 10 parts by mass or more, further preferably 12 parts by mass or more, from the viewpoint of a balance of fuel efficiency and wet grip performance. Moreover, the content of silica is preferably 150 parts by mass or less, more preferably 100 parts by mass or less, further preferably 80 parts by mass or less, further preferably 60 parts by mass or less, from the viewpoint of processability.

(Carbon black)

Carbon black is not particularly limited, and those common in the tire industry can be used such as, for example, GPF, FEF, HAF, ISAF, and SAF. These carbon black may be used alone, or two or more thereof may be used in combination.

A nitrogen adsorption specific surface area ($N_2$SA) of carbon black is preferably 50 $m^2/g$ or more, more preferably 80 $m^2/g$ or more, further preferably 100 $m^2/g$ or more, from the viewpoints of weather resistance and reinforcing property. Moreover, the $N_2$SA is preferably 250 $m^2/g$ or less, more preferably 220 $m^2/g$ or less, further preferably 180 $m^2/g$ or less, further preferably 150 $m^2/g$ or less, from the viewpoints of dispersibility, fuel efficiency, fracture characteristics, and durability. Besides, the $N_2$SA of carbon black in the present disclosure is a value measured according to JIS K 6217-2: 2017 A Method.

A content of carbon black based on 100 parts by mass of the rubber component is preferably 1 part by mass or more, more preferably 3 parts by mass or more, further preferably 5 parts by mass or more, from the viewpoints of weather resistance and reinforcing property. Moreover, it is preferably 60 parts by mass or less, more preferably 55 parts by mass or less, further preferably 50 parts by mass or less, further preferably 45 parts by mass or less, from the viewpoint of fuel efficiency.

As fillers other than silica and carbon black, those common in the tire industry can be used such as, for example, aluminum hydroxide, calcium carbonate, alumina, clay, and talc.

A total content of silica and carbon black based on 100 parts by mass of the rubber component is preferably 40 parts by mass or more, more preferably 50 parts by mass or more, further preferably 55 parts by mass or more, from the viewpoint of abrasion resistance. Moreover, it is preferably 180 parts by mass or less, more preferably 130 parts by mass or less, further preferably 110 parts by mass or less, from the viewpoint of suppressing deterioration of fuel efficiency and abrasion resistance.

(Silane Coupling Agent)

Silica is preferably used in combination with a silane coupling agent. The silane coupling agent is not particularly limited, and any silane coupling agent conventionally used in combination with silica in the tire industry can be used, such as, for example, mercapto-based silane coupling agents such as 3-mercaptopropyltrimethoxysilane and NXT-Z100, NXT-Z45, and NXT manufactured by Momentive Performance Materials; sulfide-based silane coupling agents such as bis(3-triethoxysilylpropyl)disulfide and bis(3-triethoxysilylpropyl)tetrasulfide; thioester-based silane coupling agents such as 3-octanoylthio-1-propyltriethoxysilane, 3-hexanoyl-thio-1-propyltriethoxysilane, and 3-octanoylthio-1-propyltrimethoxysilane; vinyl-based silane coupling agents such as vinyltriethoxysilane and vinyltrimethoxysilane; amino-based silane coupling agents such as 3-aminopropyltriethoxysilane, 3-aminopropyltrimethoxysilane, and 3-(2-amino-ethyl)aminopropyltriethoxysilane; glycidoxy-based silane coupling agents such as y-glycidoxypropyltriethoxysilane and γ-glycidoxypropyltrimethoxysilane; nitro-based silane coupling agents such as 3-nitropropyltrimethoxysilane and 3-nitropropyltriethoxysilane; and chloro-based silane coupling agents such as 3-chloropropyltrimethoxysilane and 3-chloropropyltriethoxysilane. Among them, sulfide-based silane coupling agents and/or mercapto-based silane coupling agents are preferable, and sulfide-based silane coupling agents are more preferable. These silane coupling agents may be used alone, or two or more thereof may be used in combination.

A content of the silane coupling agent (preferably, sulfide-based silane coupling agent) based on 100 parts by mass of silica is preferably 1 part by mass or more, more preferably 3 parts by mass or more, further preferably 5 parts by mass or more, further preferably 8 parts by mass or more, from the viewpoint of improvement in silica dispersibility. Moreover, it is preferably 20 parts by mass or less, more preferably 18 parts by mass or less, further preferably 16 parts by mass or less, from the viewpoints of cost and processability.

<Other Compounding Agents>

The rubber composition according to the present disclosure can appropriately comprise compounding agents conventionally and commonly used in the tire industry, such as, for example, softening agent, wax, processing aid, an antioxidant, stearic acid, zinc oxide, a vulcanizing agent, and a vulcanization accelerator, in addition to the above-described components.

Examples of the softening agent include, for example, a resin component, oil, and a liquid rubber, and the like.

Examples of the resin component include, but not particularly limited to, a petroleum resin, a terpene-based resin, a rosin-based resin, a phenol-based resin, a cresol resin, a resorcin resin, and the like, which are commonly used in the tire industry. Among them, one or more of the resin components selected from a group consisting of a phenol-based resin, a cresol resin, and a resorcin resin are preferable. These resin components may be used alone, or two or more thereof may be used in combination.

Examples of the phenol-based resin include, but not particularly limited to, a phenol formaldehyde resin, an alkylphenol formaldehyde resin, an alkyl phenol acetylene resin, an oil-modified phenol formaldehyde resin, and the like. These resin components may be used alone, or two or more thereof may be used in combination.

A content of the resin component when compounded based on 100 parts by mass of the rubber component is preferably 1 part by mass or more, more preferably 3 parts by mass or more, further preferably 5 parts by mass or more, from the viewpoint of wet grip performance. Moreover, the content of the resin component is preferably 60 parts by mass or less, more preferably 50 parts by mass or less, further preferably 40 parts by mass or less, particularly preferably 30 parts by mass or less, from the viewpoint of suppressing heat generation.

Examples of oil include, for example, a process oil, a vegetable oil and fat, an animal oil and fat, and the like. Examples of the process oil include a paraffinic process oil, a naphthenic process oil, an aromatic process oil, and the like. Moreover, a process oil having a low polycyclic-aromatic-compound (PCA) content for environmental measures can also be used. Examples of the process oil having a low PCA content include a mild extraction solvate (MES); a treated distillate aromatic extract (TDAE); heavy naphthenic oil; and the like. Oil may be used alone, or two or more thereof may be used in combination.

A content of oil when compounded based on 100 parts by mass of the rubber component is preferably 5 parts by mass or more, more preferably 10 parts by mass or more, further preferably 15 parts by mass or more, from the viewpoint of processability. Moreover, it is preferably 120 parts by mass or less, more preferably 60 parts by mass or less, further preferably 30 parts by mass or less, from the viewpoint of abrasion resistance. Besides, in the present disclosure, the content of oil also comprises an amount of oil contained in an oil-extended rubber.

The liquid rubber is not particularly limited as long as it is a polymer in a liquid state at room temperature (25° C.), examples of which include, for example, a liquid butadiene rubber (liquid BR), a liquid styrene-butadiene rubber (liquid SBR), a liquid isoprene rubber (liquid IR), a liquid styrene-isoprene rubber (liquid SIR), a liquid farnesene rubber, and the like. These liquid rubbers may be used alone, or two or more thereof may be used in combination.

A content of the liquid rubber when compounded based on 100 parts by mass of the rubber component is preferably 1 part by mass or more, more preferably 2 parts by mass or more, further preferably 3 parts by mass or more, particularly preferably 5 parts by mass or more. Moreover, the content of the liquid rubber is preferably 50 parts by mass or less, more preferably 40 parts by mass or less, further preferably 20 parts by mass or less.

A content of wax when compounded based on 100 parts by mass of the rubber component is preferably 0.5 parts by mass or more, more preferably 1 part by mass or more, from the viewpoint of weather resistance of a rubber. Moreover, it is preferably 10 parts by mass or less, more preferably 5 parts by mass or less, from the viewpoint of prevention of whitening of a tire due to bloom. Wax may be used alone, or two or more thereof may be used in combination.

Examples of processing aid include, for example, a fatty acid metal salt, a fatty acid amide, an amide ester, a silica surfactant, a fatty acid ester, a mixture of a fatty acid metal salt and an amideester, a mixture of a fatty acid metal salt and a fatty acid amide, and the like. For example, as processing aid, those commercially available from Schill+Seilacher GmbH, Performance Additives, etc. can be used. Processing aid may be used alone, or two or more thereof may be used in combination.

A content of the processing aid when compounded based on 100 parts by mass of the rubber component is preferably 0.5 parts by mass or more, more preferably 1 part by mass or more, from the viewpoint of exhibiting an effect of improving processability. Moreover, it is preferably 10 parts by mass or less, more preferably 8 parts by mass or less, further preferably 5 parts by mass or less, from the viewpoints of abrasion resistance and breaking strength.

Examples of the antioxidant include, but not particularly limited to, for example, amine-based, quinoline-based, quinone-based, phenol-based, and imidazole-based compounds, and antioxidants such as a carbamic acid metal salt. Preferable examples thereof include phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine and N-cyclohexyl-N'-phenyl-p-phenylenediamine; and quinoline-based antioxidants such as 2,2,4-trimethyl-1,2-dihydroquinoline polymer and 6-ethoxy-2,2,4-trimethyl-1,2-dihydroquinoline. These antioxidants may be used alone, or two or more thereof may be used in combination.

A content of the antioxidant when compounded based on 100 parts by mass of the rubber component is preferably 0.5 parts by mass or more, more preferably 1 part by mass or more, from the viewpoint of ozone crack resistance of a rubber. Moreover, it is preferably 10 parts by mass or less, more preferably 5 parts by mass or less, from the viewpoints of abrasion resistance and wet grip performance.

A content of stearic acid when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1.0 part by mass or more, further preferably 1.5 part by mass or more, from the viewpoint of processability. Moreover, it is preferably 5.0 parts by mass or less, more preferably 4.5 parts by mass or less, further preferably 4.0 parts by mass or less, from the viewpoint of abrasion resistance.

Sulfur is appropriately used as a vulcanizing agent. As sulfur, a powdery sulfur, an oil processing sulfur, a precipitated sulfur, a colloidal sulfur, an insoluble sulfur, a highly dispersible sulfur, and the like can be used. These vulcanizing agents may be used alone, or two or more thereof may be used in combination.

A content of sulfur when compounded as a vulcanizing agent based on 100 parts by mass of the rubber component is preferably 0.1 parts by mass or more, more preferably 0.3 parts by mass or more, further preferably 0.5 parts by mass or more, from the viewpoint of securing a sufficient vulcanization reaction. Moreover, it is preferably 5.0 parts by mass or less, more preferably 4.0 parts by mass or less, further preferably 3.0 parts by mass or less, from the viewpoint of prevention of deterioration. Besides, a content of the vulcanizing-agent, in a case that an oil-containing sulfur is used, is defined as a total content of pure sulfur contained in the oil-containing sulfur.

Examples of vulcanizing agents other than sulfur include, for example, an alkylphenol-sulfur chloride condensate, sodium hexamethylene-1,6-bisthiosulfate dihydrate, 1,6-bis (N,N'-dibenzylthiocarbamoyl dithio)hexan, and the like. As these vulcanizing agents other than sulfur, those commercially available from Taoka Chemical Co., Ltd., LANXESS, Flexsys, etc. can be used. These vulcanizing agents may be used alone, or two or more thereof may be used in combination.

Examples of the vulcanization accelerator include, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators, and the like. Among them, one or more vulcanization accelerators selected from a group consisting of sulfenamide-based, guanidine-based, and thiazole-based vulcanization accelerators are preferable. These vulcanization accelerators may be used alone, or two or more thereof may be used in combination.

Examples of the sulfenamide-based vulcanization accelerator include, for example, N-tert-butyl-2-benzothiazolyl sulfenamide (TBBS), N-cyclohexyl-2-benzothiazolyl sulfenamide (CBS), N, N-dicyclohexyl-2-benzothiazolyl sulfenamide (DCBS), and the like. Among them, N-cyclohexyl-2-benzothiazolyl sulfenamide (CBS) is preferable. These vulcanization accelerators may be used alone, or two or more thereof may be used in combination.

Examples of the guanidine-based vulcanization accelerator include, for example, 1,3-diphenylguanidine (DPG), 1,3-di-o-tolylguanidine, 1-o-tolylbiguanide, di-o-tolylguanidine salt of dicatechol borate, 1,3-di-o-cumenyl guanidine, 1,3-di-o-biphenyl guanidine, 1,3-di-o-cumenyl-2-propionyl guanidine, and the like. Among them, 1,3-diphenylguanidine (DPG) is preferable. These vulcanization accelerators may be used alone, or two or more thereof may be used in combination.

Examples of the thiazole-based vulcanization accelerator include, for example, 2-mercaptobenzothiazole, a cyclohexylamine salt of 2-mercaptobenzothiazole, di-2-benzothiazolyl disulfide, and the like. Among them, 2-mercaptobenzothiazole is preferable. These vulcanization accelerators may be used alone, or two or more thereof may be used in combination.

A content of the vulcanization accelerator when compounded based on 100 parts by mass of the rubber component is preferably 1 part by mass or more, more preferably 2 parts by mass or more. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

[Production of Tire]

The rubber composition according to the present disclosure can be produced by a known method. For example, it can be produced by kneading the above-described components with a rubber kneading machine such as an open roll or a sealed type kneader (a Banbury mixer, a kneader, and the like).

A kneading step includes, for example, a base kneading step of kneading compounding agents and additives other than a vulcanizing agent and a vulcanization accelerator; and a final kneading (F-kneading) step of adding the vulcanizing agent and the vulcanization accelerator to the kneaded product obtained in the base kneading step and kneading them. Additionally, the base kneading step can also be divided into multiple steps as necessary.

Examples of a kneading condition include, but not particularly limited to, for example, a method of kneading at a discharge temperature of 150° C. to 170° C. for 3 to 10 minutes in the base kneading step and kneading at 70° C. to 110° C. for 1 to 5 minutes in the final kneading step. Examples of a vulcanization condition include, but not particularly limited to, for example, a method of vulcanizing at a temperature of 140° C. to 170° C. for 10 to 40 minutes.

The tire according to the present disclosure can be produced using the above-described rubber composition by a usual method. That is, the tire can be produced by extruding an unvulcanized rubber composition, obtained by compounding the above-described components for the rubber component as necessary, into a shape of a tread with an extruder equipped with a mouthpiece having a predetermined shape, attaching it together with other tire members on a tire forming machine, and molding them by a usual method to form an unvulcanized tire, followed by heating and pressurizing this unvulcanized tire in a vulcanizing machine.

[Intended Use]

The tire according to the present disclosure can also be used as, for example, a pneumatic tire for a passenger car or for a two-wheeled vehicle in addition to a pneumatic tire for heavy duty. Moreover, the tire according to the present disclosure can also be applied to, for example, an airless tire without limiting the tire of the present disclosure to the use as a pneumatic tire. Among them, the tire of the present disclosure is preferably used as a pneumatic tire for heavy duty, from the viewpoints of the effects of the present disclosure. Besides, the tire for heavy duty refers to a tire having a maximum load capacity of 1400 kg or more. Here, the maximum load capacity has the same meaning as the standardized load.

Example

Hereinafter, the present disclosure will be described based on Examples, though the present disclosure is not limited to only these Examples.

[Examples]

Various chemicals used in Examples and Comparative examples are collectively shown below.

NR: TSR20

SBR1: HPR840 manufactured by JSR Corporation (S-SBR, styrene content: 10% by mass, vinyl content: 42 mol %, Tg: −60° C., Mw: 190,000)

SBR2: SLR3402 manufactured by TRINSEO (S-SBR, styrene content: 15% by mass, vinyl content: 30 mol %, Tg: −62° C.)

SBR3: SOL R C2525 manufactured by VERSALIS (S-SBR, styrene content: 26% by mass, vinyl content: 24 mol %, Tg: −50° C., Mw: 600,000)

SBR4: Tufdene 2000R (T2000R) manufactured by Asahi Kasei Corporation (S-SBR, styrene content: 25% by mass, vinyl content: 10 mol %, Tg: −66° C., Mw: 450,000)

CB (Carbon black) 1: DIABLACK $N_{220}$ manufactured by Mitsubishi

Chemical Corporation ($N_2$SA: 115 m²/g)

CB (Carbon black) 2: DIABLACK $N_{134}$ manufactured by Mitsubishi Chemical Corporation ($N_2$SA: 148 m²/g)

Silica 1: Ultrasil VN3 manufactured by Evonik Degussa GmbH ($N_2$SA: 175 m²/g, average primary particle size: 18 nm)

Silica 2: Ultrasil 9100GR manufactured by Evonik Degussa GmbH ($N_2$SA: 230 m²/g, average primary particle size: 15 nm)

Coupling agent (silane coupling agent): Si226 manufactured by Evonik Degussa GmbH (bis(3-triethoxysilylpropyl)disulfide)

Antioxidant: Nocrac 6C manufactured by Ouchi Shinko Chemical

Industry Co., Ltd. (N-(1,3-dimethylbutyl)-N'-phenyl-p-phenylenediamine)

Stearic acid: Bead stearic acid "*CAMELLIA*" manufactured by NOF CORPORATION

Zinc oxide: Zinc oxide No. 1 manufactured by Mitsui Mining & Smelting Co., Ltd.

Sulfur: Powdered sulfur manufactured by Karuizawa Sulfur Co, Ltd.

Vulcanization accelerator 1: Nocceler CZ manufactured by Ouchi

Shinko Chemical Industry Co., Ltd. (N-cyclohexyl-2-benzothiazolylsulfenamide (CBS))

Vulcanization accelerator 2: Nocceler D manufactured by Ouchi Shinko Chemical Industry Co., Ltd. (1,3-diphenylguanidine (DPG))

Examples and Comparative Examples

According to the compounding formulations shown in Table 1, using a 1.7 L closed Banbury mixer, all chemicals other than sulfur and a vulcanization accelerator were kneaded for 1 to 10 minutes until a discharge temperature reached 150° C. to 160° C., to obtain a kneaded product. Next, using a twin-screw open roll, sulfur and a vulcanization accelerator were added to the obtained kneaded product, and the mixture was kneaded for 4 minutes until the temperature reached 105° C., to obtain an unvulcanized rubber composition. The obtained unvulcanized rubber composition was extruded into a shape of a tread using an extruder equipped with a mouthpiece having a predetermined shape and was attached together with other tire members to produce an unvulcanized tire. The unvulcanized tire was press-vulcanized at 150° C. for 35 minutes to produce each test tire (12R22.5, tire for truck/bus). Besides, a tread pattern illustrated in FIG. 2 was used for a test tire having a flask-like groove, and a tread pattern not having flask-like circumferential grooves 9A or 9B in FIG. 2 was used for a test tire not having a flask-like groove.

<Results>

The following evaluations were performed for the obtained test tires. Results of the evaluations are shown in Table 1.

(Ratio A of Ash Content)

A ratio A (%) of an ash content of a specimen cut out of a tread of each test tire was calculated in accordance with the above-described measurement method.

(Fuel Efficiency)

Rolling resistance of each of the test tires was measured using a rolling resistance test machine when the test tires each having a rim of 8.25×22.5 were made to run at a speed of 80 km/h under a condition of an internal pressure of 900 kPa and a load of 28.76 kN, and the reciprocal number of the rolling resistance was indicated as an index with Comparative example 2 being as 100. The results show that the larger the index is, the smaller the rolling resistance is and the more excellent the fuel efficiency is.

(Wet Grip Performance)

Each test tire was mounted on all wheels of a truck (2-D vehicle) with a maximum loading capacity of 10 tons, and a braking distance from an initial speed of 100 km/h on a wet road surface was measured. Results of the measurement were indicated as indexes with Comparative example 2 being as 100, using the following equation. The results show that the larger the index is, the more excellent the wet grip performance is.

(Wet grip performance index)=(Braking distance of tire of Comparative example 2)/(Braking distance of each test tire)×100

(Abrasion Resistance)

Each test tire was mounted on all wheels of a truck (2-D vehicle) with a maximum loading capacity of 10 tons, and a groove depth of a tread part of the tire was measured after the truck was made run 8000 km, and a running distance when the groove depth of the tire was decrease by 1 mm was calculated. Results of the calculation were indicated as indexes with the running distance when the groove of the tire of Comparative example 2 was decrease by 1 mm being as 100, using the following equation. The results show that the larger the index is, the better the abrasion resistance is.

(Abrasion resistance index)=(Running distance when groove of each test tire is decreased by 1 mm)/ (Running distance when groove of tire of Comparative example 2 is decreased by 1 mm)×100

21

22

(Wet Grip Performance at Later Stage of Abrasion)

After each test tire was worn by making each test tire run a distance for which a width of a cross-section of a trunk part of a flask-like circumferential groove of the tire in Examples became maximum, wet grip performance at a later stage of abrasion was evaluated in the similar manner as that for the evaluation of wet grip performance.

(Total Performance)

A number obtained by adding up the indexes of fuel efficiency, wet grip performance, abrasion resistance, and wet grip performance at the later stage of abrasion of each test tire and dividing them by 4 is defined as a total performance index, which was used for evaluation of each test tire.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Compounding amount (part by mass) | | | | | | | | | | | |
| NR | 75 | 80 | 75 | 75 | 75 | 75 | 75 | 75 | 75 | 75 | 75 |
| SBR 1 | 25 | 20 | 25 | 25 | 25 | 25 | 25 | 25 | - | - | - |
| SBR2 | — | — | — | — | — | — | — | — | 25 | 25 | 25 |
| SBR 3 | — | — | — | — | — | — | — | — | — | — | — |
| SBR 4 | — | — | — | — | — | — | — | — | — | — | — |
| CB 1 | 5 | 5 | 10 | — | — | — | — | — | 5 | — | — |
| CB2 | — | — | — | 25 | 40 | 40 | 45 | 45 | - | 25 | 45 |
| Silica 1 | — | — | — | — | 23 | — | 15 | — | — | — | — |
| Silica 2 | 55 | 55 | 40 | 35 | — | 20 | — | 12 | 55 | 35 | 12 |
| Coupling agent | 5.5 | 5.5 | 4.0 | 3.5 | 1.8 | 2.0 | 1.2 | 1.2 | 5.5 | 3.5 | 3.5 |
| Antioxidant | 1.0 | 1.0 | 1.0 | 1.0 | 1.0 | 1.0 | 1.0 | 1.0 | 1.0 | 1.0 | 1.0 |
| Stearic acid | 3.0 | 3.0 | 3.0 | 3.0 | 3.0 | 3.0 | 3.0 | 3.0 | 3.0 | 3.0 | 3.0 |
| Zinc oxide | 3.5 | 3.5 | 3.5 | 3.5 | 3.5 | 3.5 | 3.5 | 3.5 | 3.5 | 3.5 | 3.5 |
| Sulfur | 1.5 | 1.5 | 1.5 | 1.5 | 1.5 | 1.5 | 1.5 | 1.5 | 1.5 | 1.5 | 1.5 |
| Vulcanization accelerator 1 | 1.5 | 1.5 | 1.5 | 1.5 | 1.5 | 1.5 | 1.5 | 1.5 | 1.5 | 1.5 | 1.5 |
| Vulcanization accelerator 2 | 1.0 | 1.0 | 1.0 | 0.8 | 0.8 | 0.8 | 0.8 | 0.8 | 1.0 | 0.8 | 0.8 |
| Ratio A of ash content (%) | 92% | 92% | 81% | 61% | 40% | 37% | 29% | 26% | 92% | 61% | 26% |
| Flask groove | present | present | present | present | present | present | present | present | present | present | present |
| Performance (index) | | | | | | | | | | | |
| Fuel efficiency | 106 | 107 | 104 | 103 | 106 | 106 | 104 | 105 | 104 | 102 | 104 |
| Wet grip | 120 | 118 | 115 | 112 | 109 | 110 | 108 | 108 | 120 | 112 | 110 |
| Abrasion resistance | 100 | 102 | 104 | 106 | 106 | 108 | 110 | 112 | 101 | 107 | 111 |
| Wet grip at a later stage | 117 | 116 | 115 | 109 | 107 | 106 | 106 | 107 | 118 | 109 | 106 |
| Total | 443 | 443 | 438 | 430 | 428 | 430 | 428 | 432 | 443 | 430 | 431 |
| Total index | 111 | 111 | 110 | 108 | 107 | 108 | 107 | 108 | 111 | 108 | 108 |

| | Comparative example | | | | | |
|---|---|---|---|---|---|---|
| | 1 | 2 | 3 | 4 | 5 | 6 |
| Compounding amount (part by mass) | | | | | | |
| NR | 75 | 75 | 75 | 75 | 75 | 75 |
| SBR 1 | 25 | 25 | 25 | — | — | — |
| SBR2 | — | — | — | 25 | 25 | — |
| SBR 3 | — | — | — | — | — | 25 |
| SBR 4 | — | — | — | — | — | — |
| CB 1 | 55 | — | — | — | — | 5 |
| CB 2 | — | 50 | 45 | 50 | 45 | — |
| Silica 1 | — | — | 10 | — | 10 | — |
| Silica 2 | — | — | — | — | — | 55 |
| Coupling agent | — | — | 6.0 | — | 6.0 | 5.5 |
| Antioxidant | 1.0 | 1.0 | 1.0 | 1.0 | 1.0 | 1.0 |
| Stearic acid | 3.0 | 3.0 | 3.0 | 3.0 | 3.0 | 3.0 |
| Zinc oxide | 3.5 | 3.5 | 3.5 | 3.5 | 3.5 | 3.5 |
| Sulfur | 1.5 | 1.5 | 1.5 | 1.5 | 1.5 | 1.5 |
| Vulcanization accelerator 1 | 1.5 | 1.5 | 1.5 | 1.5 | 1.5 | 1.5 |
| Vulcanization accelerator 2 | — | — | 1.0 | — | 1.0 | 1.0 |
| Ratio A of ash content (%) | 6% | 7% | 23% | 7% | 23% | 92% |
| Flask groove | present | present | present | present | present | present |
| Performance (index) | | | | | | |
| Fuel efficiency | 96 | 100 | 100 | 100 | 101 | 83 |
| Wet grip | 101 | 100 | 102 | 99 | 101 | 118 |

TABLE 1-continued

| Abrasion resistance | 95 | 100 | 95 | 101 | 97 | 82 |
|---|---|---|---|---|---|---|
| Wet grip at a later stage | 100 | 100 | 103 | 100 | 100 | 116 |
| Total | 392 | 400 | 400 | 400 | 399 | 399 |
| Total index | 98 | 100 | 100 | 100 | 100 | 100 |

| | Comparative example | | | | | |
|---|---|---|---|---|---|---|
| | 7 | 8 | 9 | 10 | 11 | 12 |
| Compounding amount (part by mass) | | | | | | |
| NR | 75 | 75 | 75 | 75 | 75 | 75 |
| SBR 1 | — | — | — | — | — | — |
| SBR2 | — | — | — | 25 | 25 | 25 |
| SBR 3 | 25 | — | — | — | — | — |
| SBR 4 | — | 25 | 25 | — | — | — |
| CB 1 | — | 5 | — | 5 | — | — |
| CB 2 | 40 | — | 40 | — | 25 | 40 |
| Silica 1 | — | — | — | — | — | — |
| Silica 2 | 20 | 55 | 20 | 55 | 35 | 20 |
| Coupling agent | 2.0 | 5.5 | 2.0 | 5.5 | 3.5 | 2.0 |
| Antioxidant | 1.0 | 1.0 | 1.0 | 1.0 | 1.0 | 1.0 |
| Stearic acid | 3.0 | 3.0 | 3.0 | 3.0 | 3.0 | 3.0 |
| Zinc oxide | 3.5 | 3.5 | 3.5 | 3.5 | 3.5 | 3.5 |
| Sulfur | 1.5 | 1.5 | 1.5 | 1.5 | 1.5 | 1.5 |
| Vulcanization accelerator 1 | 1.5 | 1.5 | 1.5 | 1.5 | 1.5 | 1.5 |
| Vulcanization accelerator 2 | 0.8 | 1.0 | 0.8 | 1.0 | 0.8 | 0.8 |
| Ratio A of ash content (%) | 37% | 92% | 37% | 92% | 61% | 37% |
| Flask groove | present | present | present | absent | absent | absent |
| Performance (index) | | | | | | |
| Fuel efficiency | 79 | 88 | 82 | 104 | 102 | 106 |
| Wet grip | 112 | 117 | 115 | 115 | 110 | 108 |
| Abrasion resistance | 95 | 78 | 86 | 100 | 107 | 108 |
| Wet grip at a later stage | 109 | 114 | 112 | 81 | 78 | 76 |
| Total | 395 | 397 | 395 | 400 | 397 | 398 |
| Total index | 99 | 99 | 99 | 100 | 99 | 100 |

From the results shown in Table 1, it can be found that the tires of Examples of the present disclosure are excellent in a total evaluation of fuel efficiency, wet grip performance, abrasion resistance, and wet grip performance at the later stage of abrasion, as compared with the tires of Comparative examples.

[Embodiments]

Examples of embodiments of the present disclosure are described below.

[1] A tire comprising a tread part of a rubber composition comprising a rubber component comprising an isoprene-based rubber and a styrene-butadiene rubber, wherein a vinyl content of the styrene-butadiene rubber is greater than 26 mol % or is preferably 27 mol % or more, more preferably 28 mol % or more, further preferably 29 mol % or more, further preferably 30 mol % or more, wherein a ratio A of an ash content of the rubber composition that is defined by the following formula is greater than 25% or is preferably 26% or more, more preferably 29% or more, further preferably 37% or more, further preferably 60% or more, further preferably 80% or more, further preferably 90% or more, wherein the tread part comprises two or more circumferential main grooves extending in a tire circumferential direction, and land parts partitioned by the circumferential main grooves, wherein at least one land part of the land parts comprises at least one flask-like circumferential groove extending in the tire circumferential direction, and wherein the flask-like circumferential groove comprises a neck part having a narrow groove width, and a trunk part arranged on an inner side in a tire radial direction with respect to the neck part and having a part with a groove width greater than a maximum groove width of the neck part:

$$A = (m_2/m_1) \times 100$$

(wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize an organic substance, and $m_2$ denotes a mass of a residue after oxidation and combustion by heating, in air in accordance with JIS K 6226-1:2003, the residue after the pyrolysis and the vaporization (mass: $m_1$)).

[2] The tire of [1] above, wherein a minimum groove width W1 of the neck part is 1 to 2 mm, preferably 1.1 to 1.9 mm, more preferably 1.2 to 1.8 mm.

[3] The tire of [1] or [2] above, wherein a maximum groove width W2 of the trunk part is 2 to 12 mm, preferably 3 to 11 mm, more preferably 4 to 10 mm.

[4] The tire of any one of [1] to [3] above, wherein the maximum groove width W2 of the trunk part is 2 to 6 times, preferably 2.5 to 5.5 times, more preferably 3 to 5 times, as large as the minimum groove width W1 of the neck part.

[5] The tire of any one of [1] to [4] above, wherein a depth H1 of the flask-like circumferential groove on a meridional cross-section of the tire and a distance H2 from a groove bottom of the flask-like circumferential groove to the neck part satisfy the following relational expression:

$$1/3 \leq H2/H1 \leq 2/3$$

[6] The tire of any one of [1] to [5] above, wherein the flask-like circumferential groove further comprises an opening part that is arranged on an outer side in a tire radial direction with respect to the neck part and whose groove width expands in a tapered shape and toward the outside in the tire radial direction.

[7] The tire of any one of [1] or [6] above, wherein the rubber composition comprises silica.

[8] The tire of [7] above, wherein a nitrogen adsorption specific surface area of the silica is 175 $m^2/g$ or more, preferably 185 $m^2/g$ or more, more preferably 195 $m^2/g$ or more.

[9] The tire of any one of [1] to [8] above, wherein the rubber composition comprises carbon black.

[10] The tire of any one of [1] to [9] above, wherein a styrene content of the styrene-butadiene rubber is preferably 24% by mass or less, more preferably 18% by mass or less, further preferably 16% by mass or less.

[11] The tire of any one of [1] to [10] above, wherein the rubber composition comprises 0.5 to 5.0 parts by mass, preferably 1.0 to 4.5 parts by mass, more preferably 1.5 to 4.0 parts by mass, of zinc oxide.

[12] The tire of any one of [1] to [11] above, wherein the land parts having the flask-like circumferential groove are present on an area located between a pair of outermost circumferential main grooves that are located on the outermost sides in a tire width direction among the two or more circumferential main grooves.

[13] The tire of any one of [1] to [12] above, wherein the tire is a heavy-duty tire.

REFERENCE SIGNS LIST

1 Tire
2 Tread part
3 Sidewall part
4 Bead part
5 Bead core
6 Carcass layer
7 Belt layer
8A, 8B, 8C, 8D Circumferential main groove
9A, 9B Flask-like circumferential groove
TE1, TE2 Tread grounding end
TW Tread grounding width
CL Centerline of tire
Neck part
12 Trunk part
13 Tapered part
W1 Minimum groove width of neck part
W2 Maximum groove width of trunk part
W3 Maximum groove width of tapered part
H1 Depth of flask-like circumferential groove H2 Distance from groove bottom to neck part of flask-like circumferential groove
20, 50 Shoulder land part
21, 51 Shoulder sipe
22, 52 Shoulder lateral groove
30, 40 Center land part
31, 41 Center sipe

What is claimed is:

1. A tire comprising a tread part that is formed of a rubber composition, wherein the rubber composition comprises a rubber component comprising an isoprene-based rubber in an amount of 75% to 90% by mass and a styrene-butadiene rubber in an amount of 10% to 25% by mass, the styrene-butadiene rubber has a vinyl content that is greater than 26 mol % and not more than 45 mol %, the styrene-butadiene rubber has a styrene content of 5% by mass or more and 18% by mass or less, the rubber composition has a ratio A of ash content defined by the following formula that is greater than 25%, the tread part comprises two or more circumferential main grooves extending in a tire circumferential direction, and land parts partitioned by the circumferential main grooves, at least one land part of the land parts comprises at least one flask-like circumferential groove extending in the tire circumferential direction, the flask-like circumferential groove comprises a neck part having a narrow groove width, and a trunk part arranged on an inner side in a tire radial direction with respect to the neck part and having a part with a groove width greater than a maximum groove width of the neck part:

$$A = (m_2/m_1) \times 100$$

wherein $m_1$ denotes a mass of a residue obtained by soaking a specimen of the rubber composition in acetone for 72 hours to extract a soluble component in accordance with JIS K 6229 and heating the specimen after the extraction from room temperature to 750° C. in nitrogen in accordance with JIS K 6226-1:2003 to pyrolyze and vaporize an organic substance, and $m_2$ denotes a mass of a residue after oxidation and combustion by heating, in air in accordance with JIS K 6226-1:2003, the residue after the pyrolysis and the vaporization (mass: $m_1$).

2. The tire of claim 1, wherein a minimum groove width W1 of the neck part is 1 to 2 mm.

3. The tire of claim 1, wherein a maximum groove width W2 of the trunk part is 2 to 12 mm.

4. The tire of claim 1, wherein the maximum groove width W2 of the trunk part is 2 to 6 times as large as the minimum groove width W1 of the neck part.

5. The tire of claim 1, wherein a depth H1 of the flask-like circumferential groove on a meridional cross-section of the tire and a distance H2 from a groove bottom of the flask-like circumferential groove to the neck part satisfy the following relational expression:

$$1/3 \leq H2/H1 \leq 2/3.$$

6. The tire of claim 1, wherein the flask-like circumferential groove further comprises an opening part that is arranged on an outer side in a tire radial direction with respect to the neck part and whose groove width expands in a tapered shape and toward the outside in the tire radial direction.

7. The tire of claim 1, wherein the rubber composition further comprises carbon black.

8. The tire of claim 1, wherein the rubber composition has a zinc oxide content of 0.5 to 5.0 parts by mass of zinc oxide based on 100 parts by mass of the rubber component.

9. The tire of claim 1, wherein the land parts having the flask-like circumferential groove are present on an area located between a pair of outermost circumferential main grooves that are located on the outermost sides in a tire width direction among the two or more circumferential main grooves.

10. The tire of claim 1, wherein the tire is a heavy-duty tire.

11. The tire of claim 1, wherein the rubber composition has a silica content of 10 to 80 parts by mass based on 100 parts by mass of the rubber component, and a carbon black content of 3 to 60 parts by mass based on 100 parts by mass of the rubber component.

12. The tire of claim 1, wherein the ratio A of the ash content is 25% to 100%.

13. The tire of claim 1, wherein carbon black is present in an amount of 3 to 60 parts by mass and the silica is present in an amount of 10 to 60 parts by mass, wherein both amounts are based on 100 parts by mass of the rubber component.

14. The tire of claim 1, wherein silica has a nitrogen adsorption specific surface area ($N_2SA$) of 175 $m^2/g$ or more.

* * * * *